United States Patent
Javvadi et al.

(10) Patent No.: US 9,483,561 B2
(45) Date of Patent: Nov. 1, 2016

(54) SERVER INVENTORY TRENDS

(71) Applicant: Bank of America Corporation, Charlotte, NC (US)

(72) Inventors: Ganesh Javvadi, Hyderabad (IN); Priyanka Tripathy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 295 days.

(21) Appl. No.: 14/163,513

(22) Filed: Jan. 24, 2014

(65) Prior Publication Data

US 2015/0215178 A1  Jul. 30, 2015

(51) Int. Cl.
*H04L 12/26* (2006.01)
*G06F 17/30* (2006.01)
*H04L 12/24* (2006.01)

(52) U.S. Cl.
CPC ....... *G06F 17/30864* (2013.01); *H04L 41/024* (2013.01); *H04L 41/0253* (2013.01); *H04L 41/0853* (2013.01); *H04L 41/22* (2013.01); *H04L 43/06* (2013.01); *H04L 43/065* (2013.01)

(58) Field of Classification Search
CPC .. G06F 11/2028; G06F 11/203; G06F 13/14; G06F 17/3061; G06F 17/30893; G06F 8/65; G06F 9/5027; G06F 9/5061; G06F 9/50; H04L 41/069; H04L 45/00; H04L 63/101; H04L 41/024; H04L 41/0253; H04L 41/22; H04L 41/0853; H04L 43/06; H04L 43/065
See application file for complete search history.

(56) References Cited

U.S. PATENT DOCUMENTS

| | | |
|---|---|---|
| 6,816,905 B1 * | 11/2004 | Sheets ............... G06F 9/5061 709/226 |
| 6,868,444 B1 | 3/2005 | Kim et al. |
| 6,968,373 B1 | 11/2005 | Norris et al. |
| 7,165,071 B2 | 1/2007 | Fanning et al. |
| 7,805,419 B2 | 9/2010 | Newman |
| 7,870,564 B2 | 1/2011 | Copeland et al. |
| 7,979,530 B1 | 7/2011 | Lee |
| 8,087,016 B2 | 12/2011 | Childress et al. |
| 8,234,186 B2 | 7/2012 | Alba et al. |
| 8,402,123 B2 | 3/2013 | DeHaan et al. |
| 8,812,586 B1 * | 8/2014 | Kulkarni ............ H04L 41/069 709/203 |
| 2005/0222885 A1 * | 10/2005 | Chen ..................... G06F 9/50 703/13 |

(Continued)

*Primary Examiner* — Le H Luu
(74) *Attorney, Agent, or Firm* — Banner & Witcoff, Ltd.; Michael A. Springs

(57) ABSTRACT

Methods for monitoring and reporting server inventory trends are disclosed. An authorized user may access a website and input a specified time period and platform to view pertinent server inventory trends. A managing computing server receives the request for server inventory trends and may run one or more procedures to retrieve relevant information from at least one database. The relevant information may be transferred from the database to a fusion chart to be plotted for display. The managing computing server may display a report of server inventory information, such as the number of active servers, added servers, and retired servers for the platform over the specified time period.

20 Claims, 7 Drawing Sheets

(56) References Cited

U.S. PATENT DOCUMENTS

| | | | |
|---|---|---|---|
| 2005/0257248 A1† | 11/2005 | Kegel et al. | |
| 2006/0112123 A1† | 5/2006 | Clark et al. | |
| 2006/0129499 A1* | 6/2006 | Combar | G06F 17/30893 705/64 |
| 2006/0129649 A1* | 6/2006 | Cobb | G06F 17/3061 709/206 |
| 2006/0179171 A1† | 8/2006 | Stefaniak et al. | |
| 2009/0182812 A1† | 7/2009 | Bajpay et al. | |
| 2009/0222565 A1* | 9/2009 | Ben-Shachar | H04L 63/101 709/229 |
| 2009/0300181 A1* | 12/2009 | Marques | G06F 9/5061 709/226 |
| 2009/0327459 A1* | 12/2009 | Yoo | H04L 45/00 709/221 |
| 2010/0088197 A1 | 4/2010 | DeHaan et al. | |
| 2012/0150699 A1 | 6/2012 | Trapp et al. | |
| 2012/0179824 A1* | 7/2012 | Jackson | G06F 9/5027 709/226 |
| 2013/0103976 A1* | 4/2013 | Takamoto | G06F 11/2028 714/4.3 |
| 2013/0117766 A1* | 5/2013 | Bax | G06F 13/14 719/323 |
| 2014/0201564 A1* | 7/2014 | Jagtiani | G06F 11/203 714/4.11 |
| 2015/0020061 A1* | 1/2015 | Ravi | G06F 8/65 717/172 |

\* cited by examiner
† cited by third party

SERVER INVENTORY TRENDS

TECHNICAL FIELD

Aspects of the disclosure relate generally to monitoring server inventory trends. Specifically, aspects of the disclosure relate to a system and method for monitoring and reporting server inventory statistics for a specified time period.

BACKGROUND

Enterprises today rely on numerous servers to perform various tasks. These enterprises, such as large banks, for example, often rely on hundreds or thousands of servers at any given time. The servers may provide one or more of a variety of services for enterprise clients, employees, and the like. For instance, the servers may be used by the enterprise to host a web site that may be accessible via the Internet. Clients may access the website via client computers that may run on one of many operating systems (e.g., Unix, Wintel, and the like).

Enterprises often dedicate servers for each of the operating system platforms. Moreover, enterprises, such as banks, may provide support groups for each server platform. Currently, these support groups are unable to view up to date enterprise server statistics. The server inventory in an enterprise is dynamic, with servers continuously being added and others being retired. With an accurate report of server inventory trends, enterprises may be able to more efficiently allocate resources among servers and support groups. Thus, there is a need for a system and method of monitoring and reporting server inventory trends.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a computer-implemented method, comprising: receiving, at a processor, a request for server inventory trends; executing, at the processor, at least one Structured Query Language (SQL) procedure, wherein the at least one SQL procedure causes the processor to retrieve pertinent server information from one or more databases; transferring, at the processor, the pertinent server information from the one or more databases to a fusion chart; plotting, at the fusion chart, the pertinent server information, wherein the plotting generates output data; and outputting, at the processor, the output data.

Certain other aspects disclose a non-transitory computer-readable storage medium having computer-executable program instructions stored thereon that, when executed by a processor, cause the processor to: receive a request for server inventory trends; execute at least one Structured Query Language (SQL) procedure, wherein the at least one SQL procedure causes the processor to retrieve pertinent server information from one or more databases; transfer the pertinent server information from the one or more databases to a fusion chart; plot, at the fusion chart, the pertinent server information, wherein the plotting generates output data; and output the output data.

Certain other aspects disclose an apparatus comprising: a memory; a processor, wherein the processor executes computer-executable program instructions which cause the processor to: receive a request for server inventory trends; execute at least one Structured Query Language (SQL) procedure, wherein the at least one SQL procedure causes the processor to retrieve pertinent server information from one or more databases; transfer the pertinent server information from the one or more databases to a fusion chart; plot, at the fusion chart, the pertinent server information, wherein the plotting generates output data; and output the output data.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain principles of the disclosure. In the drawings:

FIGS. 4-7 show illustrative screen shots of server inventory trends according to aspects of the disclosure.

DETAILED DESCRIPTION

In accordance with various aspects of the disclosure, methods, non-transitory computer-readable media, and apparatuses are disclosed for monitoring and outputting server inventory trends. In certain aspects, when a server receives a request data from a computing device, the server processes and analyzes the request and provides the requested data. The automated process may utilize various hardware components (e.g., processors, communication servers, memory devices, and the like) and related computer algorithms to generate image data related to the agency's business data.

Figure 1:
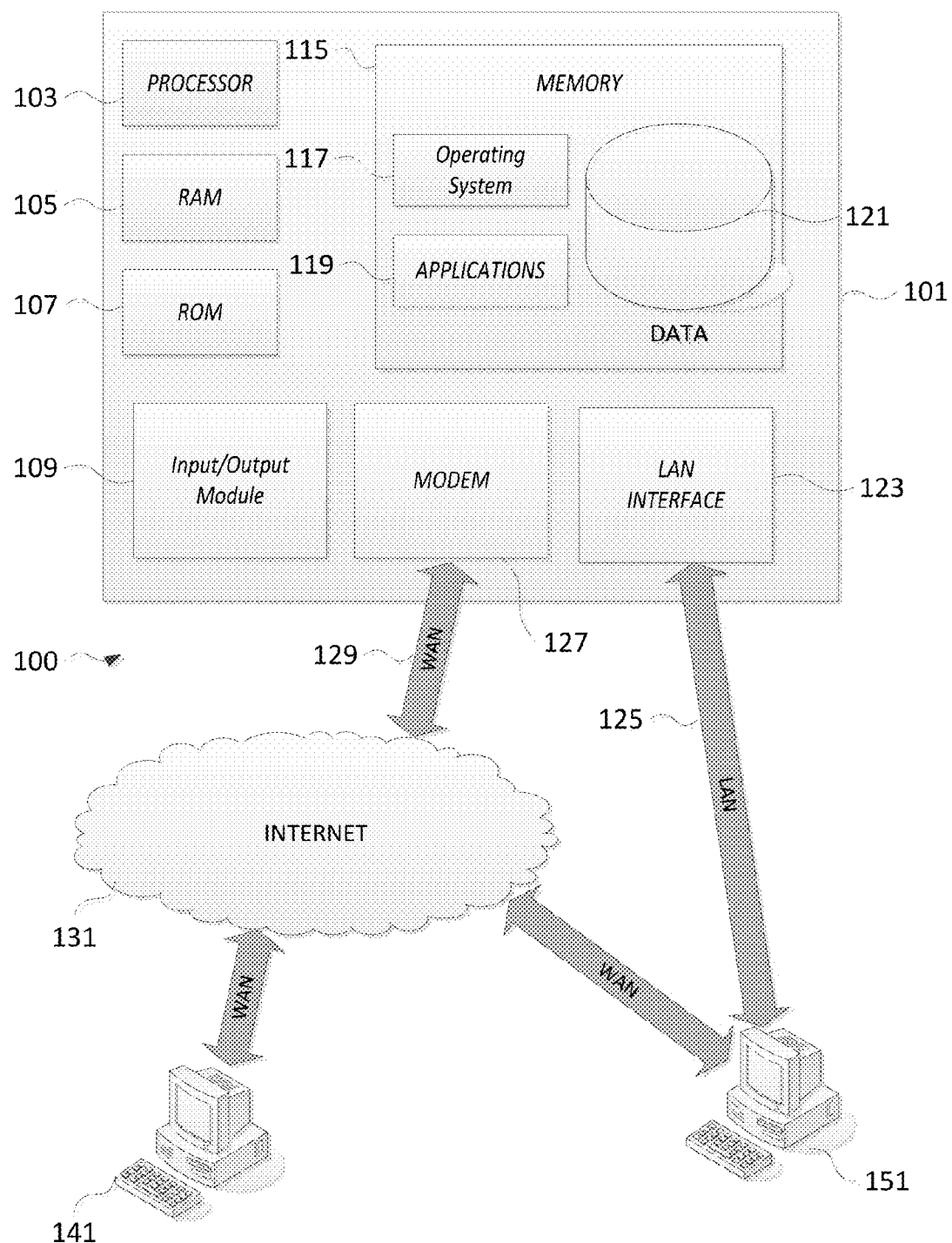
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a managing computing server 101 wherein the processes discussed herein may be implemented. The managing computing server 101 may have a processor 103 for controlling the overall operation of the managing computing server 101 and its associated components, including random-access memory (RAM) 105, read-only memory (ROM) 107, communications module 109, and memory 115. Processor 103 and its associated components may allow the managing computing server 101 to run a series of computer-readable instructions related to receiving, storing, and analyzing data.

Managing computing server 101 typically includes a variety of computer-readable media. Computer-readable media may be any available media that may be accessed by managing computing server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by managing computing server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the managing computing server 101 is on and corresponding software applications (e.g., software tasks) are running on the managing computing server 101.

Communications module 109 may include a microphone, keypad, touch screen, and/or stylus through which a user of managing computing server 101 may provide input, and may also include one or more of a speaker for providing audio output and a video display device for providing textual, audiovisual and/or graphical output.

Software may be stored within memory 115 and/or storage to provide instructions to processor 103 for enabling managing computing server 101 to perform various functions. For example, memory 115 may store software used by the managing computing server 101, such as an operating system 117, application programs 119, and an associated database 121. In certain aspects, managing computing server 101 may comprise a plurality of databases 121. Also, some or all of the computer executable instructions for managing computing server 101 may be embodied in hardware or firmware.

Managing computing server 101 may operate in a networked environment supporting connections to one or more remote computing devices, such as computing devices 141 and 151. The computing devices 141 and 151 may be personal computing devices or servers that include many or all of the elements described above relative to the managing computing server 101.

The network connections depicted in FIG. 1 include a local area network (LAN) 125 and a wide area network (WAN) 129, but may also include other networks. When used in a LAN networking environment, managing computing server 101 may be connected to the LAN 125 through a network interface or adapter in the communications module 109. When used in a WAN networking environment, the managing computing server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate web pages.

Additionally, one or more application programs 119 used by the managing computing server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by a managing computing server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on managing computing server 101. Such a processor may execute computer-executable instructions stored on a computer-readable medium.

Figure 2:
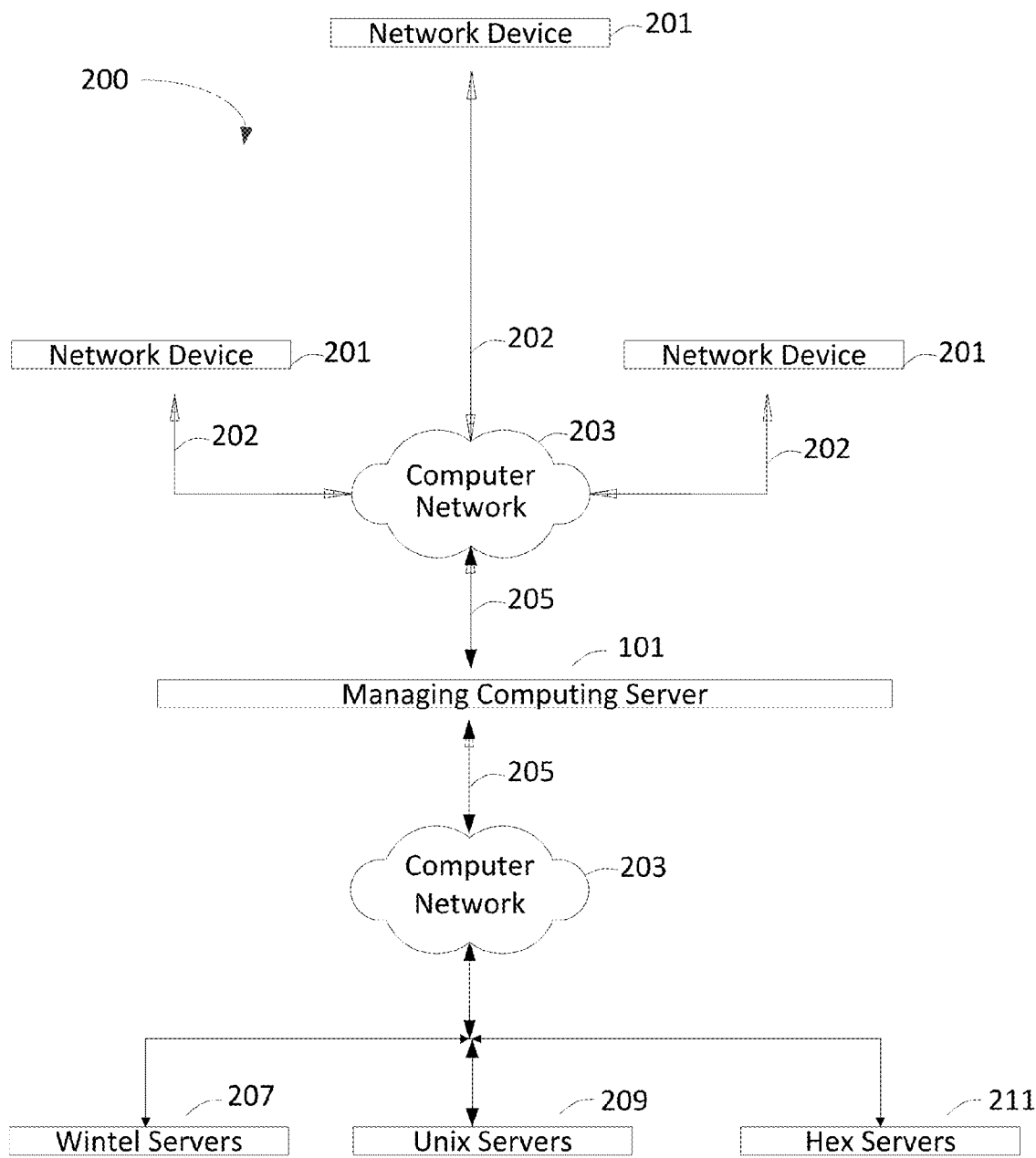
FIG. 2 shows an illustrative block diagram of network devices and server that may be used to implement the processes and function of one or more aspects of the present disclosure.

FIG. 2 illustrates another example operating environment in which various aspects of the disclosure may be implemented. As illustrated, system 200 may include one or more network devices 201. Network devices 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more network devices 201 may be located within a branch office of a financial institution. Such network devices may be used, for example, by customer service representatives, other employees, and/or customers of the financial institution in conducting financial transactions via network 203. Additionally or alternatively, one or more network devices 201 may be located at a user location (e.g., a customer's home or office). Such network devices also may be used, for example, by customers of the financial institution in conducting financial transactions via computer network 203.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between network devices 201 and server 204, such as network links, dial-up links, wireless links, hard-wired links, and/or the like.

In some aspects, FIG. 2 may illustrate a snapshot of an enterprise's system architecture. The system 200 may comprise one or more managing computing servers 101 in communication with one or more support servers in the system 200. As illustrated in FIG. 2, the support servers may comprise servers operating on a variety of platforms, such as Wintel servers 207, Unix servers 209, and Hex servers 211. The support servers displayed in FIG. 2 are exemplary only, and not intended to be exclusive or limiting. Managing computing server 101 may communicate with various other types of support servers in addition to Wintel servers 207, Unix servers 209, and Hex servers 211. Managing computing server 101 may also communicate with and manage other types of support servers and may not communicate with at least one of Wintel servers 207, Unix servers 209, and Hex servers 211. However, for exemplary purposes, the present disclosure will explained with reference to system 200 as shown in FIG. 2 including Wintel servers 207, Unix servers 209, and Hex servers 211.

Each of the support servers illustrated in FIG. 2 represents one or more support servers. For example, Wintel servers 207 represent one or more Wintel servers. Unix servers 209 represent one or more Unix servers, and Hex servers 211 represent one or more Hex servers. In some large enterprises, each support server may represent tens or hundreds of thousands of servers. As an example, Wintel servers 207 may represent 30,000 individual Wintel servers.

In some aspects, an enterprise may assign support groups for the various support servers. The support groups may overlook and manage an entire collection of support servers or a particular portion of support servers. For instance, an enterprise may assign a support group for all Wintel servers 207 or, particularly large enterprises, may assign multiple support groups to overlook particular portions of Wintel servers 207. The division of support groups may be made by business unit or by some other method determined by the enterprise. Thus, the enterprise may comprise one or more support groups for Wintel servers 207, one or more support groups for Unix servers 209, and one or more support groups for Hex servers 211.

As should be appreciated, the landscape of system 200 may be continuously changing. Support servers may be added to system 200 and other support servers may be retired from system 200. On a given day, system 200 may comprise 30,000 Wintel servers 207 and may comprise 25,000 Wintel servers 207 one month later. The server inventory tool described in the present disclosure may provide accurate support server statistics for a specified time period. The server statistics may be used by support groups and other authorized users to gain a clear understanding of the system landscape and more efficiently allocate resources throughout system 200.

Having described an example of a computing device that can be used in implementing various aspects of the disclosure and an operating environment in which various aspects of the disclosure can be implemented, several embodiments will now be discussed in greater detail.

Figure 3:
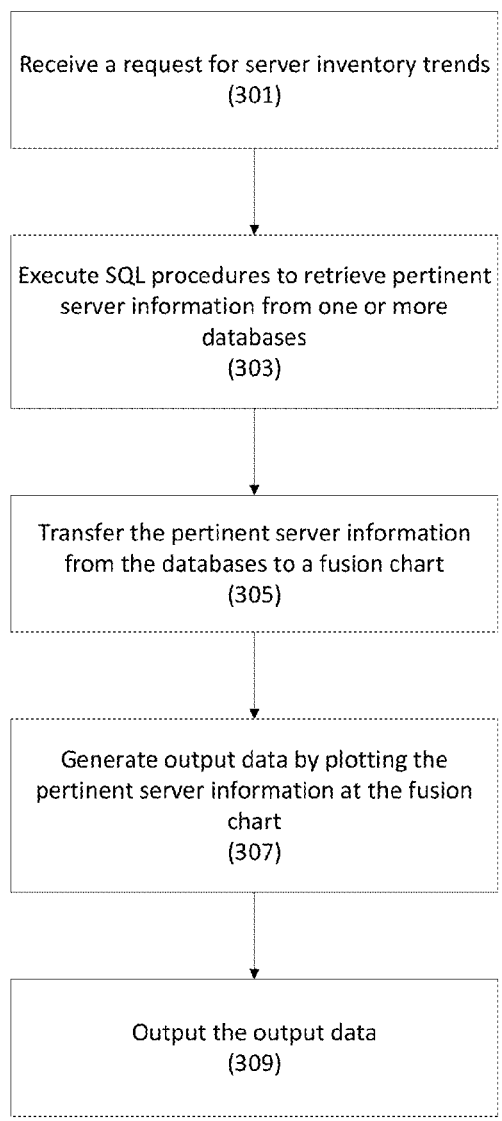
FIG. 3 shows an illustrative flow chart in accordance with aspects of the disclosure.

FIG. 3 illustrates an exemplary flow chart according to aspects of the disclosure. At step 301, managing computing server 101 may receive a request for server inventory trends. The request may be transmitted from, for example, computing devices 141 and 151 or network devices 201. In certain aspects, a user may access data provided by managing computing server 101. For instance, managing computing server 101 may post data to a web site accessible via the Internet. A user may access the web site using a network device 201. For example, a user may enter into network device 201 a universal resource locator (URL) associated with the managing computing server 101 to access the web site. In some aspects, managing computing server 101 may only enable authorized users to access the server inventory tool displayed on the website. Thus, after a user enters the URL address, managing computing server 101 may display authentication information. The authentication information may comprise a form to enter a username and a password, login pin, and the like.

Managing computing server 101 may analyze the user response to the authentication information to determine whether the user is an authorized user. To do so, managing computing server 101 may perform one of several authentication techniques that are well-known in the art. After the user is deemed an authorized user at managing computing server 101, or in certain aspects where authentication is not required, as soon as the user accesses the enterprise's web site, managing computing server 101 may display a web page including trend selection 401, shown in FIG. 4.

Figure 4:
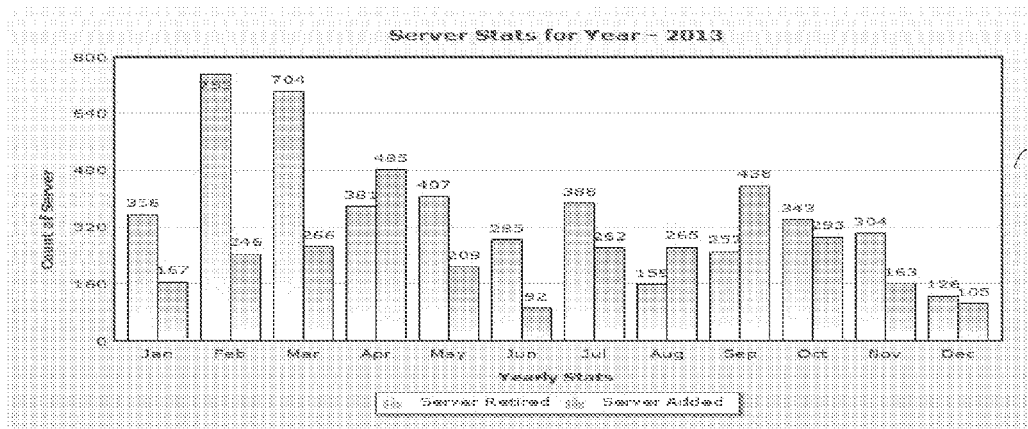
Figure 4:
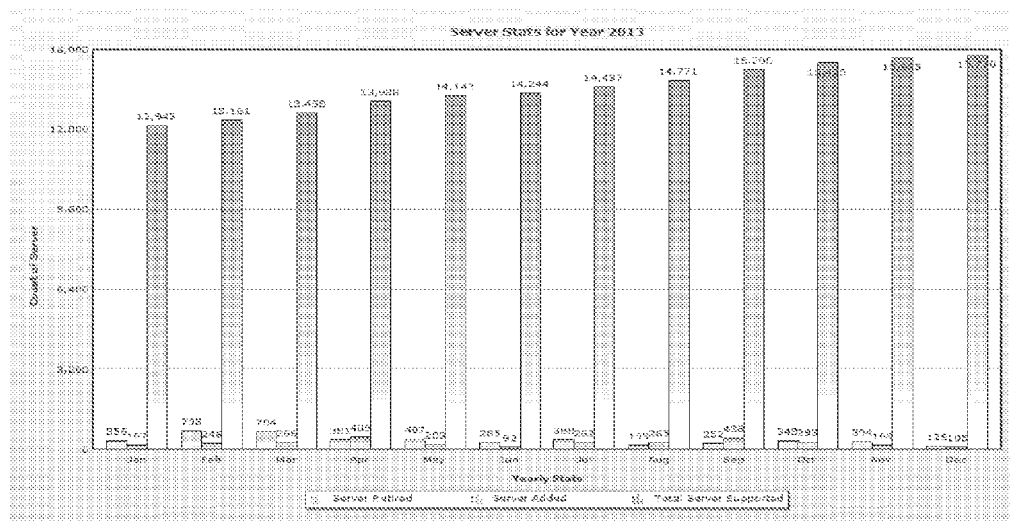

Trend selection 401 may enable a user to select parameters used by managing computing server 101 to output desired server inventory trends. In other words, a user may be interested in viewing specific server inventory trends and may input the parameters of those specific server inventory trends in trend selection 401. As shown in FIG. 4, the trend selection 401 parameters may include a year selection and a PGPGroup selection. Trend selection 401 may include drop-down menus that enable a user to select desired parameter entries. In some aspects, trend selection 401 may comprise other options for inputting parameter entries such as forms, listed options with correspond buttons, and the like.

Trend selection 401 may display a year selection option and corresponding dropdown menu enabling user to select a desired year. For instance, a user may select the dropdown arrow next to the displayed year, thereby causing the server inventory tool to display a plurality of year selections. In the example provided in FIG. 4, the user has selected year 2013. The user may also select a desired support group unit via the PGPGroup Selection dropdown menu. By selecting the corresponding dropdown menu, a user may be presented with a plurality of server inventory options. The server inventory options may be delineated by platform, support group, business unit, and the like. As shown in exemplary FIG. 4, the user has selected Wintel servers 207. PGP6253 refers to a tag supported by a particular Wintel support group in the enterprise. The PGPGroup Selection dropdown menu may comprise various tags supported by various enterprise support groups.

Figure 5:
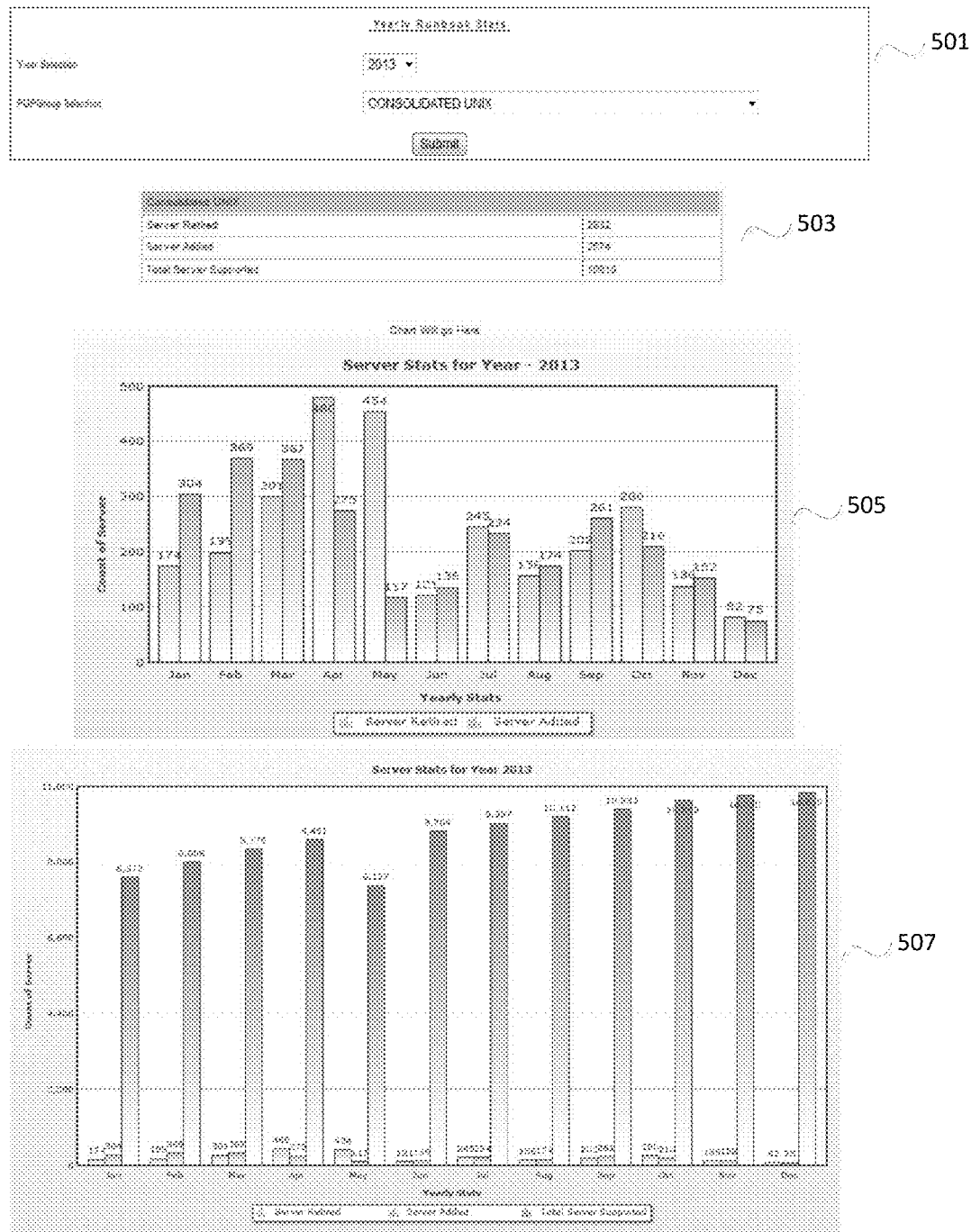

In certain aspects, the server inventory tool may display options to select consolidated server trends. For example, as shown in FIG. 5, trend selection 501 may comprise a consolidated Unix option from the PGPGroup selection dropdown menu. By selecting consolidated Unix, a user may be indicating to managing computing server 101 that he would like to view server inventory trends for all Unix server 209. Similarly, the dropdown menu may comprise options to view consolidated Wintel, indicating server inventory trends for all Wintel servers 207.

Figure 6:
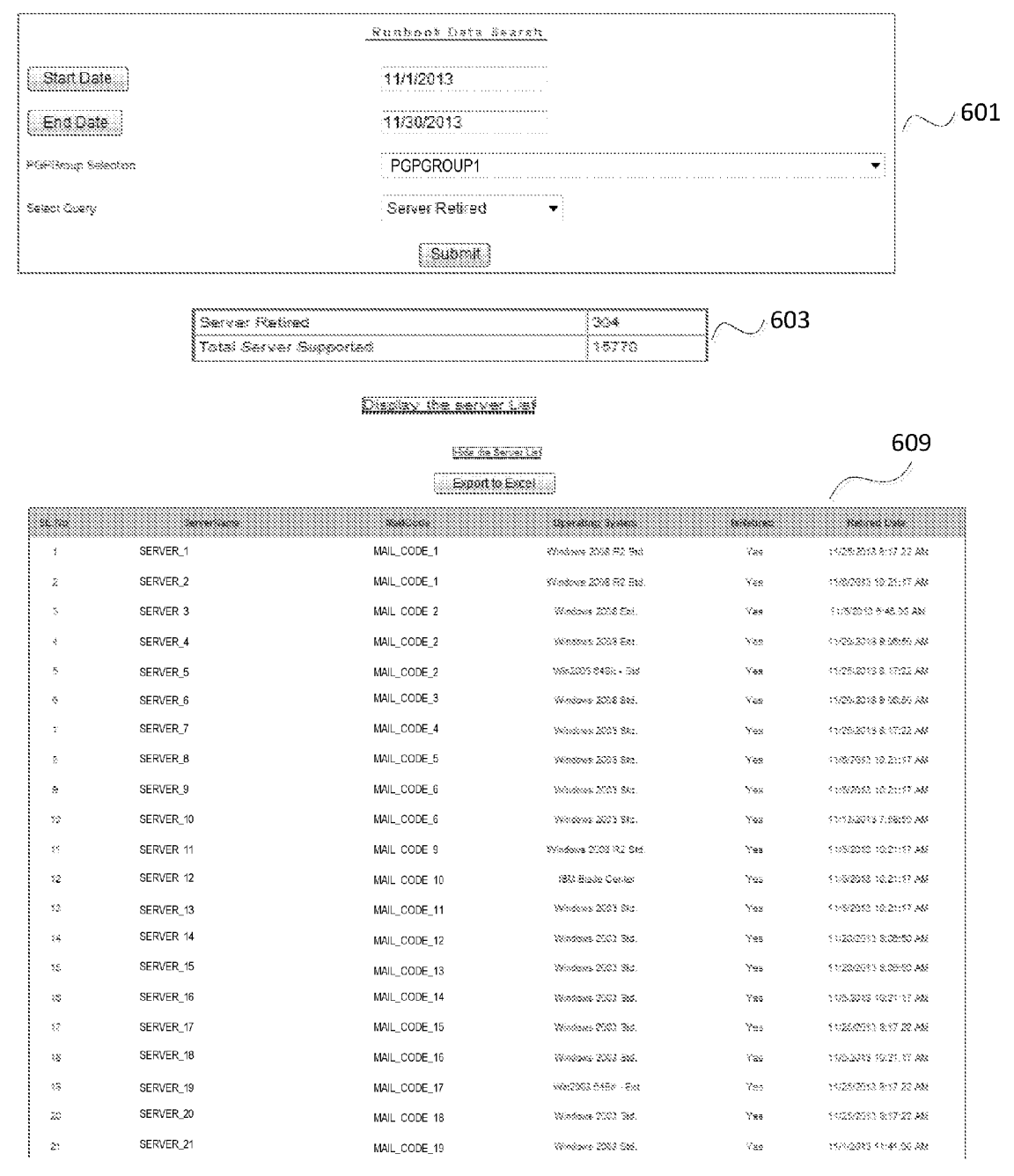

Another exemplary trend selection 601 is illustrated in FIG. 6. Trend selection 601 may comprise a form in which a user may enter a start date and a form in which a user may enter an end date. The entered start date and end date serve as a specified time range. Also shown at trend selection 601, a user may select a platform (in this example Wintel) and may select a tagged or consolidated option (in this example tag PGP6253). Trend selection 601 also comprises an option to select a query. This option enables a user to further narrow a server inventory trend search by selecting a query such as servers retired, servers added, servers active, and the like. Trend selection 601 may also comprise other narrowing options, such as the mailcode option shown in trend selection 701. The server mailcode may provide identifying information about the location of particular servers.

After the user has selected his desired parameters from the enterprise web site (from trend selection 401, for example), the user may select the submit button (shown in trend selection 401). The entry and submission of the desired parameters may then serve as a request for server inventory trends. Managing computing server 101 may receive the request for server inventory trends at step 301, shown in FIG. 3.

After managing computing server 101 receives a request for server inventory trends at step 301, it may execute SQL procedures to retrieve pertinent server information one or more databases at step 303. Server information for all servers in an enterprise may be stored in databases such as database 121. Each managing computing server 101 may comprise one or more databases 121 and there may be a plurality of managing computing servers 101 in the system 200. In certain aspects, system 200 may comprise database similar to database 121 that independent from, and not within managing computing server 101. These one or more databases in system 200 may receive and store server information for all servers in system 200. The server information may include whether the server is active, when it was activated, whether the server is retired, when it was retired, when the server was added, and the like. For a large enterprise with thousands of servers, the server information stored in the databases may be extensive. Furthermore, it may prove essentially impossible for an individual to sift through the databases to identify pertinent server information.

The pertinent server information may comprise server statistics for the specified time range and platform received by the managing computing server 101 at step 301. Such pertinent information may comprise a number of active servers, a number of retired servers, and a number of added servers for the platform during the specified time range. For example, managing computing server 101 may receive a request for server inventory trends with the specified time range of year 2013 and specified platform of Wintel PGP6253 after a user submits the info shown in trend selection 401. Pertinent server information may comprise the number of active servers, the number of retired servers, and the number of added servers to the Wintel PGP6253 in 2013.

In order to retrieve the pertinent server information, managing computing server 101 may execute one or more SQL procedures and queries at step 303. The SQL procedures may be stored in managing computing server 101 at memory 115. In certain aspects, the SQL procedures may be stored in another SQL server located in system 200. The SQL procedures may be executed by processor 103 and may pull pertinent information from the appropriate databases. In at least one aspect, managing computing server 101 may use two SQL procedures to retrieve pertinent information from the databases in system 200.

After step 303, pertinent server information may be transferred from the databases to a fusion chart at step 305. The fusion chart may be stored in managing computing server 101, for example at memory 115. In certain aspects, the pertinent server information may be transferred to the fusion chart as an Extensible Markup Language (XML) data string. After the XML data string is transferred to the fusion chart, managing computing server 101 may generate output data by plotting the pertinent server information at the fusion chart at step 307. The output data, illustrated in FIGS. 4-7, may be output by the managing computing server 101 at step 309.

The output data shown in FIGS. 4-7 may be displayed from managing computing server on one or more web pages. The output data may comprise a table such as table 403 listing one or more of the number of servers retired, added, and supported by the specified platform during the specified time range at trend selection 401. As shown in exemplary FIG. 4, table 403 displays that in 2013 4,458 Wintel PGP6253 servers were retired, 2,991 Wintel PGP6253 servers were added, and there was a total of 15,770 servers supported by Wintel PGP6253.

The output data generated at step 307 may also comprise graphs depicting the pertinent server information, such as modified stats 405 and total stats 407. Modified stats 405 may display a graphical representation of the number of pertinent servers added and retired. In FIG. 4, the pertinent server information is displayed monthly, but the server inventory tool may display the pertinent server information at other intervals, such as daily, weekly, and the like. Modified stats 405 may display to a user the modifications made to the pertinent server inventory. Modifications may include the number of servers added and the number of servers retired. The output data may also comprise the total stats 407, which may indicate not only the number of pertinent servers added and retired, but also the total number of pertinent servers supported. Again, pertinent servers may refer to servers of the specified platform during the specified time range.

FIG. 5 illustrates similar output data for consolidate Unix servers 209 in year 2013. Table 503 may display the number of Unix servers 209 retired, added, and supported during the specified time range (here, 2013). Modified stats 505 may display as a graph the number of Unix servers retired and added throughout year 2013. Total stats 507, like total stats 407, may display as a graph the total number of servers supported, added, and retired. The consolidated view shown in FIG. 5 may be particularly beneficial to enterprise managers in charge of overseeing various platform server support groups. For example, by selecting consolidated Unix at trend selection 501, a manager may be presented with a view of all Unix servers in the enterprise, rather than a select few handled by a particular support group.

FIG. 6 displays a table 603. The table 603 shown in FIG. 6 may display only the servers retired and supported, and not the number of servers added, in response to a user's server inventory request at trend selection 601 indicating a select query of servers retired. In other words, a user may select at trend selection 601 to view the number of servers retired via the corresponding dropdown menu. Thus, table 603 may display the number of servers retired without the number of servers added. For greater detail, a user may select a link, thereby causing managing computing server 101 to display a server list 609. Server list 609 may provide additional information about the pertinent servers identified in table 603. Specifically, serial list 609 may comprise server identification information such as server serial numbers, server names, mailcodes, operating systems, and the like. Moreover, the server identification information may include a notification of whether a server is retired and the date and time when the server was retired. The server list 609 may also include an option to export server identification information to a spreadsheet.

Figure 7:
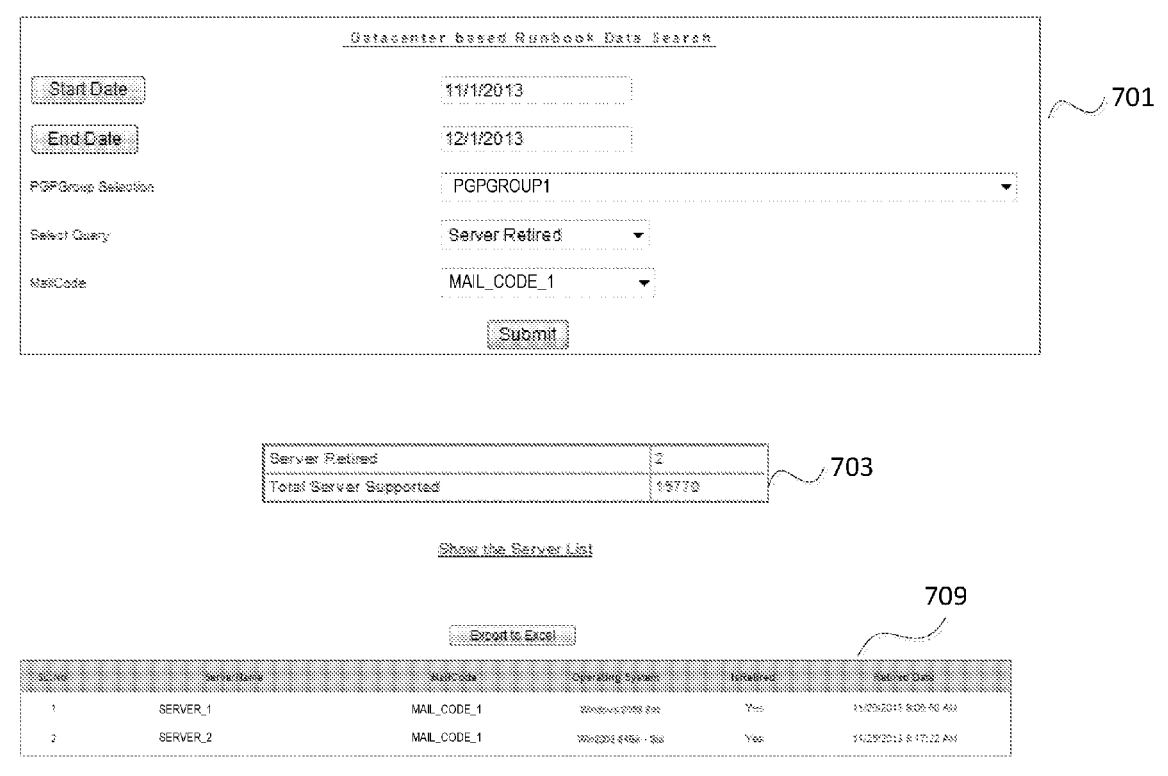

FIG. 7 displays a table 703 similar to table 603. Table 703 in exemplary FIG. 7 may display a narrower list of results due to the mailcode parameter selected at trend selection 701. A user may select a link to view the server list 709. Managing computing server 101 may then display the server list with the pertinent server identification information.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A computer-implemented method, comprising:
   receiving, at a processor of a managing computing server, a request for server inventory trends, wherein the managing computing server is in communication with one or more support servers, wherein the one or more support servers operate on one or more platforms, wherein the managing computing server is in communication with one or more databases comprising pertinent server information associated with the one or more support servers, and wherein the request comprises a trend selection;
   responsive to receiving the request, executing, at the processor, one or more Structured Query Language (SQL) procedures and one or more SQL queries, wherein the one or more SQL procedures and the one or more SQL queries cause the processor to retrieve the pertinent server information from one or more databases based, at least in part, on the trend selection, and wherein the pertinent server information comprises whether the one or more support servers are active, deactivated, retired, when they were added, and when they were retired;
   transferring, at the processor, the pertinent server information from the one or more databases to a fusion chart as an Extensible Markup Language (XML) data string, and storing the fusion chart in the managing computing server;
   plotting, at the fusion chart, the pertinent server information, wherein the plotting generates output data; and
   outputting, at the processor, the output data, wherein the output data includes modified stats and total stats associated with the one or more support servers, and wherein the output data is displayed at intervals.

2. The method of claim 1, wherein the trend selection comprises a specified time range and platform.

3. The method of claim 2, wherein the pertinent server information comprises server statistics for the specified time range and platform.

4. The method of claim 2, wherein the pertinent server information comprises a number of active servers, a number of retired servers, and a number of added servers for the platform during the specified time range.

5. The method of claim 1, further comprising outputting server identification information comprising at least one of a support server's serial number, name, mailcode, and operating system.

6. The method of claim 1, wherein output data comprises graphs depicting the pertinent server information.

7. The method of claim 1, wherein the pertinent server information transferred to the fusion chart comprises an Extensible Markup Language (XML) data string.

8. A non-transitory computer-readable storage medium having computer-executable program instructions stored thereon that, when executed by a processor, cause the processor to:
   receive, at a managing computing server, a request for server inventory trends, wherein the managing computing server is in communication with one or more support servers, wherein the one or more support severs operate on one or more platforms, wherein the managing computing server is in communication with one or more databases comprising pertinent server information associated with the one or more support servers, and wherein the request comprises a trend selection;
   responsive to receiving the request, execute one or more Structured Query Language (SQL) procedures and one or more SQL queries, wherein the one or more SQL procedures and the one or more SQL queries cause the processor to retrieve the pertinent server information from one or more databases based, at least in part, on the trend selection, and wherein the pertinent server information comprises whether the one or more support servers are active, deactivated, retired, when they were added, and when they were retired;

transfer the pertinent server information from the one or more databases to a fusion chart as an Extensible Markup Language (XML) data string, and store the fusion chart in the managing computing server;

plot, at the fusion chart, the pertinent server information, wherein the plotting generates output data; and output the output data, wherein the output data includes modified stats and total stats associated with the one or more support servers, and wherein the output data is displayed at intervals.

9. The non-transitory computer-readable storage medium of claim 8, wherein the trend selection comprises a specified time range and platform.

10. The transitory computer-readable storage medium of claim 9, wherein the pertinent server information comprises server statistics for the specified time range and platform.

11. The transitory computer-readable storage medium of claim 9, wherein the pertinent server information comprises a number of active servers, a number of retired servers, and a number of added servers for the platform during the specified time range.

12. The transitory computer-readable storage medium of claim 8, wherein the computer-executable program instructions further cause the processor to output server identification information comprising at least one of a support server's serial number, name, mailcode, and operating system.

13. The transitory computer-readable storage medium of claim 8, wherein output data comprises graphs depicting the pertinent server information.

14. An apparatus comprising:
a memory;
a processor, wherein the processor executes computer-executable program instructions which cause the processor to:
receive, at a managing computing server, a request for server inventory trends, wherein the managing computing server is in communication with one or more support servers, wherein the one or more support servers operate on one or more platforms, wherein the managing computing server is in communication with one or more databases comprising pertinent server information associated with the one or more support servers, and where the request comprises a trend selection;

responsive to receiving the request, execute one or more Structured Query Language (SQL) procedures and one or more SQL queries, wherein the one or more SQL procedures and the one or more SQL queries cause the processor to retrieve the pertinent server information from one or more databases based, at least in part, on the trend selection, and wherein the pertinent server information comprises whether the one or more support servers are active, deactivated, retired, when they were added, and when they were retired;

transfer the pertinent server information from the one or more databases to a fusion chart as an Extensible Markup Language (XML) data string, and store the fusion chart in the managing computing server;

plot, at the fusion chart, the pertinent server information, wherein the plotting generates output data; and output the output data, wherein the output data includes modified stats and total stats associated with the one or more support servers, and wherein the output data is displayed at intervals.

15. The apparatus of claim 14, wherein the trend selection comprises a specified time range and platform.

16. The apparatus of claim 15, wherein the pertinent server information comprises server statistics for the specified time range and platform.

17. The apparatus of claim 15, wherein the pertinent server information comprises a number of active servers, a number of retired servers, and a number of added servers for the platform during the specified time range.

18. The apparatus of claim 15, wherein the computer-executable program instructions further cause the processor to output server identification information comprising at least one of a support server's serial number, name, mailcode, and operating system.

19. The apparatus of claim 14, wherein output data comprises graphs depicting the pertinent server information.

20. The apparatus of claim 14, wherein the pertinent server information transferred to the fusion chart comprises an Extensible Markup Language (XML) data string.

* * * * *